United States Patent [19]
Hobson

[11] Patent Number: 6,112,164
[45] Date of Patent: Aug. 29, 2000

[54] COMPUTER SYSTEM THERMAL MANAGEMENT

[75] Inventor: Louis B. Hobson, Tomball, Tex.

[73] Assignee: Compaq Computer Corporation, Houston, Tex.

[21] Appl. No.: 09/052,438

[22] Filed: Mar. 31, 1998

[51] Int. Cl.⁷ .................................................. G05D 23/00
[52] U.S. Cl. .......................................... 702/132; 713/300
[58] Field of Search ............................. 702/132; 713/320, 713/300, 322, 323, 324, 330; 327/512, 513

[56] References Cited

U.S. PATENT DOCUMENTS

| | | | |
|---|---|---|---|
| 5,560,022 | 9/1996 | Dunstan et al. | 395/750 |
| 5,590,061 | 12/1996 | Hollowell, II et al. | 364/571.03 |
| 5,687,079 | 11/1997 | Bauer et al. | 364/175 |
| 5,838,575 | 11/1998 | Pippin | 364/488 |
| 5,848,381 | 12/1998 | Ishii et al. | 702/99 |
| 5,940,786 | 8/1999 | Steeby | 702/132 |
| 5,953,536 | 9/1999 | Nowlin, Jr. | 395/750.05 |
| 5,996,084 | 11/1999 | Watts | 713/323 |
| 6,002,240 | 12/1999 | McMahan et al. | 320/150 |
| 6,014,611 | 1/2000 | Arai et al. | 702/132 |
| 6,029,119 | 2/2000 | Atkinson | 702/132 |
| 6,038,671 | 3/2000 | Tran et al. | 713/300 |

OTHER PUBLICATIONS

Steele, "ACPI Thermal Sensing and Control in the PC", IEEE, pp. 169–182, Feb. 1998.

LM75 Data Sheet from National Semiconductor Corp, pp. 1–16, Jan. 2000.

Intel/Microsoft/Toshiba, "Advanced Configuration and Power Interface Specification", Revision 1.0, Dec. 22, 1996.

*Primary Examiner*—Patrick Assouad
*Attorney, Agent, or Firm*—Conley, Rose & Tayon, P.C.

[57] ABSTRACT

A thermal management technique for a computer system having a thermal device and a timer includes establishing a thermal window having low and high temperature thresholds, causing the timer to generate an interrupt at a specified interval, and processing the interrupt. During interrupt processing, if the thermal device indicates the current temperature is outside the established thermal window, the thermal window is adjusted by resetting the low and high temperature thresholds to bracket the current temperature and then notifying the operating system that a thermal event has occurred.

47 Claims, 4 Drawing Sheets

COMPUTER SYSTEM THERMAL MANAGEMENT

BACKGROUND

The invention relates to the thermal management of a computer system executing an advanced configuration and power interface (ACPI) operating system.

Known thermal management techniques, such as those implemented under the advanced power management (APM) specification, controlled thermal set points and initiated cooling options via firmware that operated without intervention, control, or knowledge of the operating system (e.g., via system management interrupts, SMI).

Many non-ACPI (legacy) computer systems utilize one-shot thermal devices for monitoring system temperatures. These devices are not designed to generate regular, periodic interrupts for reporting their current temperature reading to an operating system. For example, the widely used National Semiconductor LM75 device has two temperature trip points: over temperature shutdown (OS) and hysteresis (HYST). When the LM75 detects a temperature equal to or greater than the OS trip point it generates an over temperature shutdown output (OSO) signal which a computer system hardware designer can use to generate an operating system interrupt. Later, when the LM75 detects a temperature at or below the HYST trip point, it can again drive its OSO output.

Once the LM75 detects a temperature exceeding its OS trip point (driving OSO), it can drive OSO again only when the HYST trip point is met. If the system's temperature continues to rise, the LM75 is unable to initiate any action to notify the operating system. Conversely, if the LM75 activates OSO for a temperature drop below the HYST trip point, it can only drive OSO again when it detects a temperature rise above the OS trip point. A continued drop in temperature would go unnoticed by the operating system.

Under the new ACPI specification, computer system thermal management is controlled by the operating system itself and not by firmware invoked via operating system transparent interrupts. ACPI thermal management schemes are based on regions known as thermal zones. A thermal zone can represent an entire computer system or any portion thereof. (Generally, thermal zones are defined around a significant source of heat such as a computer system's central processing unit.) To effectively manage thermal zones, an ACPI operating system requires monitoring of the temperature of each zone, ideally at regular intervals.

It would be beneficial to be able to use existing one-shot thermal devices to generate interrupts every n seconds, or at every n degree of temperature change (where n is a specified value). This capability would allow legacy computer systems using a one-shot thermal device to implement ACPI thermal management procedures.

SUMMARY

In one aspect, the invention provides a method and apparatus for use in thermal management in a computer system adapted to execute an operating system. The computer system includes a thermal device that periodically senses a temperature in the computer system but does not initiate delivery of thermal information to the operating system except when the sensed temperature passes out of a programmable preset thermal window. The method includes maintaining a thermal window having low temperature and high temperature threshold values that bracket the current sensed temperature. If the sensed temperature is outside the thermal window, the low and high temperature thresholds are adjusted to again bracket the sensed temperature and the operating system is notified of a thermal event.

Embodiments of the invention may include one or more of the following features. Thermal event detection is performed by an operating system transparent interrupt such as a system management interrupt, while thermal event notification (to the operating system) is performed via an operating system visible interrupt such as a system control interrupt. The thermal device is interrogated for a sensed temperature every n seconds, where n can be any value. The thermal window can bracket the sensed temperature by any amount. For example, the low temperature threshold could be five degrees below the sensed temperature while the high temperature threshold could be five degrees above the sensed temperature. There is, however, no requirement that the low and high temperature thresholds be symmetrical about the sensed temperature.

DETAILED DESCRIPTION

Figure 1:
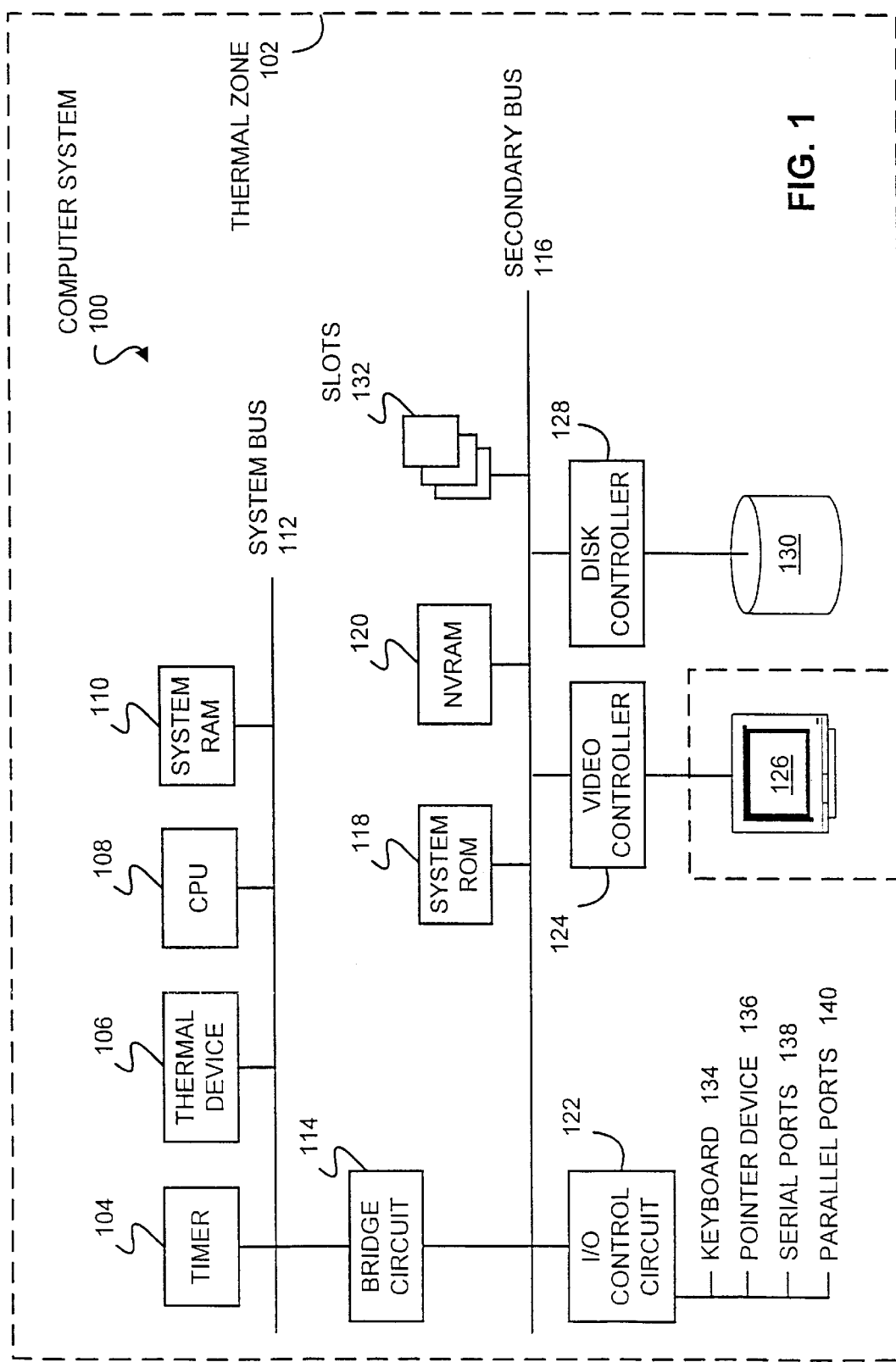
FIG. 1 shows a computer system.

Referring to FIG. 1, an advanced configuration and power interface (ACPI) computer system 100 having a single thermal zone 102 includes timer 104, one-shot (legacy) thermal monitoring device 106, host processor (CPU) 108, and system random access memory 110 coupled to system bus 112. Timer 104 can be programmed to generate an operating system transparent system management interrupt (SMI) at a specified interval. Thermal device 106 is thermally coupled to the host processor 108. Illustrative host processors 108 include the PENTIUM, PENTIUM PRO, PENTIUM-II, and 80X86 families of processors from Intel Corporation. Timer 104 and thermal device 106 are described below.

Bridge circuit 114 couples system bus 112 to secondary bus 116. Components coupled to secondary bus 116 include: read only memory (ROM) 118; non-volatile RAM (NVRAM) 120; input-output (I/O) control circuit 122; video controller 124 and associated display 126; disk controller 128 and associated disks (one shown) 130; and one or more expansion slots 132. Expansion slots 132 can, for example, be used to include a network interface card (NIC), a modem, or a printer control card. Input-output control circuit 122 can provide an interface for user keyboard 134, pointer device 136, and serial 138 and parallel 140 ports.

Figure 2:
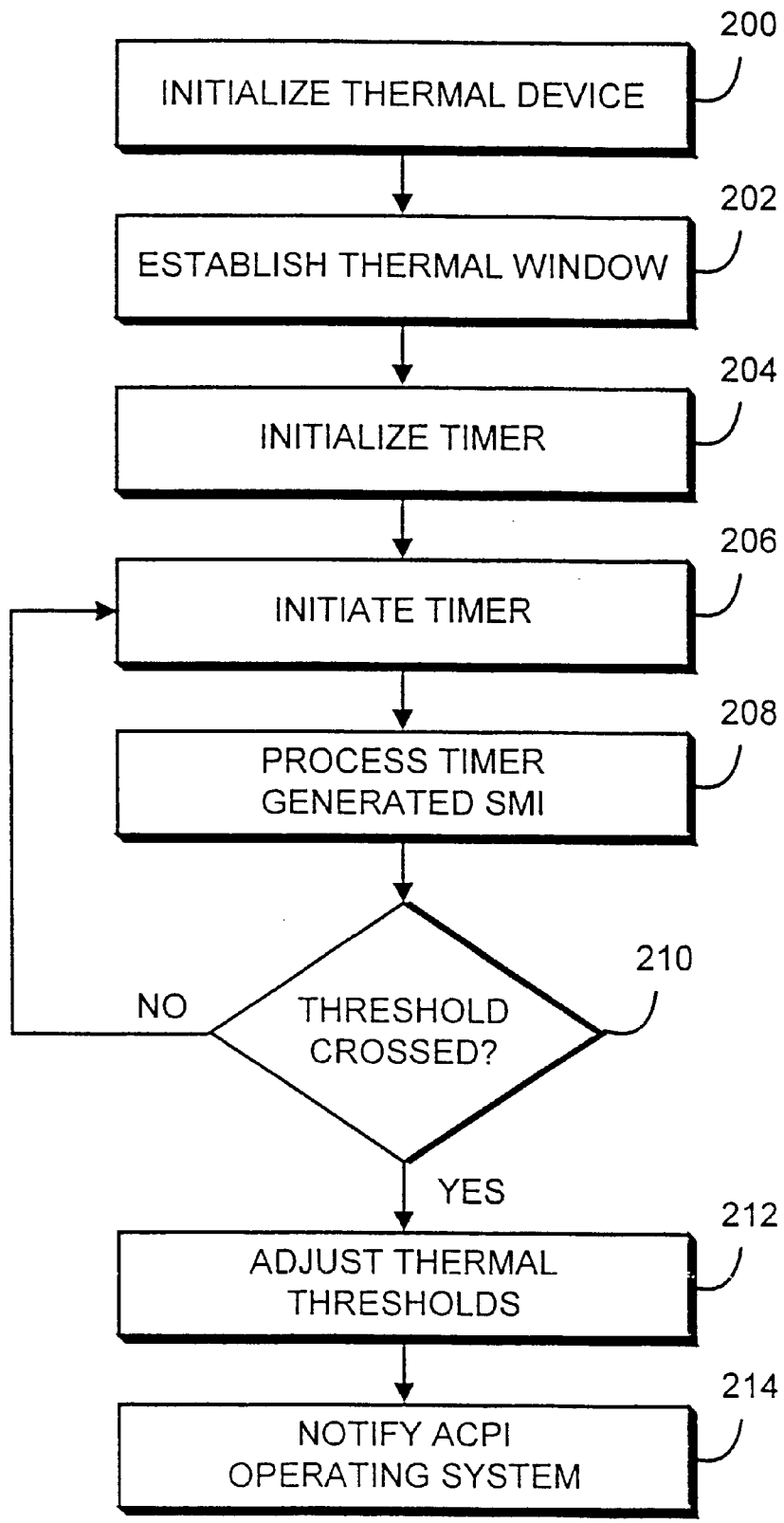
FIG. 2 shows a method to monitor temperature in an advanced configuration and power interface (ACPI) computer system using a legacy thermal device.

As shown in FIG. 2, timer 104 and one-shot thermal device 106 can be used to provide regular/periodic thermal input to an ACPI operating system. One-shot thermal device 106 is initialized by setting its low and high temperature trip points to values that prevent the device from generating a thermal interrupt during normal operation (step 200). The current temperature is then read from thermal device 106 and a thermal window having two software thermal thresholds are established that bracket the current operational temperature (step 202). Timer 104 is programmed to generate a SMI at a specified fixed interval (step 204) after being started (step 206). The timer 104 generated SMI invokes program code (a SMI handler) that determines if one of the software thermal threshold has been crossed (step 208). If either a low or high temperature threshold has been crossed (the 'yes' prong of step 210), the software thermal thresholds are adjusted to again bracket the current temperature (step 212) and the ACPI operating system is informed of the thermal event (i.e., a crossed thermal threshold) by way of a system control interrupt (SCI) at step 214. The ACPI operating system then processes the thermal event in accordance with a predefined thermal policy. If neither a low or high temperature threshold has been crossed (the 'no' prong of step 210), thermal monitoring continues at step 206.

Figure 3:
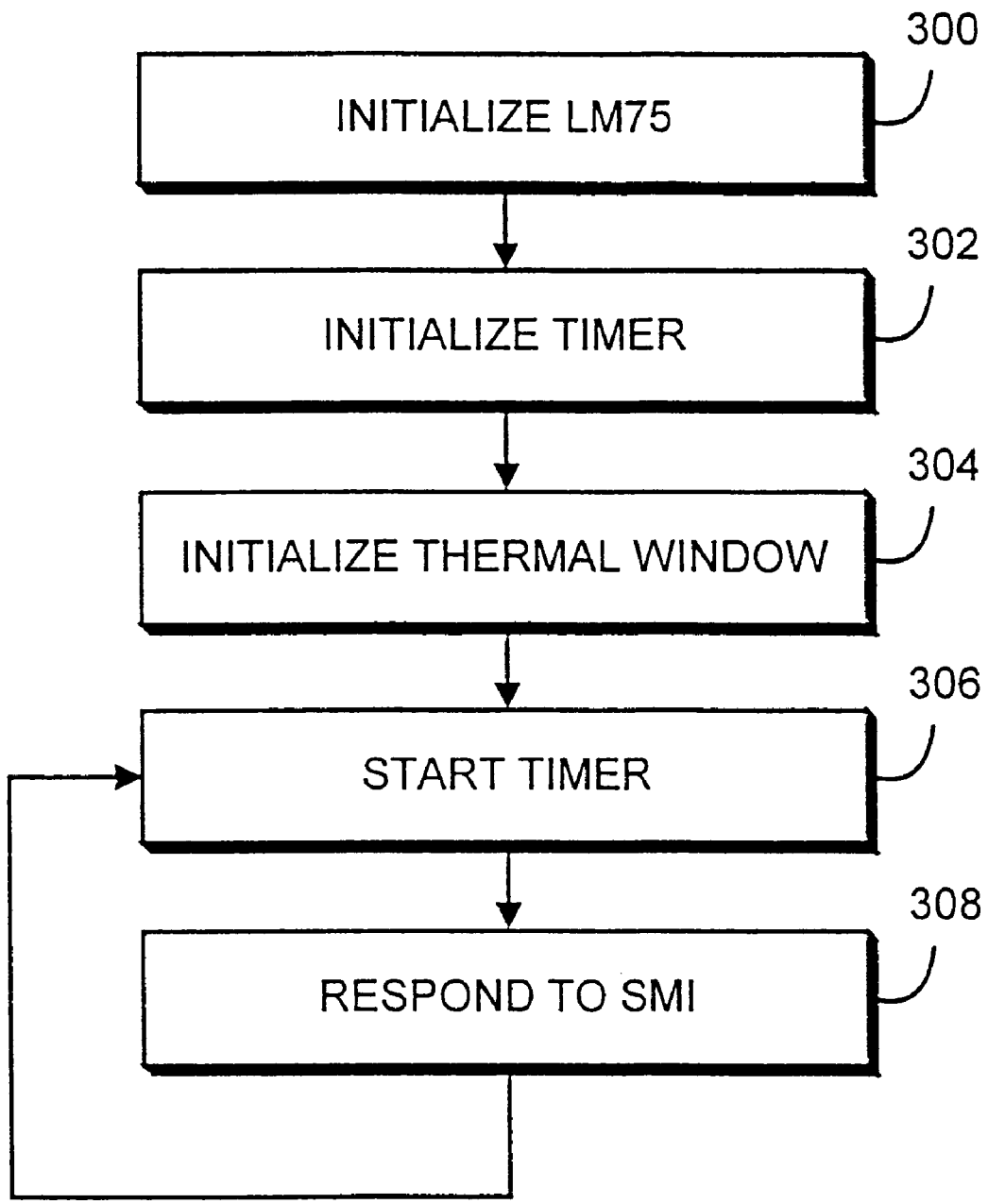
FIG. 3 shows a method to monitor temperature in an ACPI computer system using a LM75 thermal device.

When thermal device 106 is a National Semiconductor LM75, the above described process can be implemented as shown in FIG. 3. On computer system 100 start-up, the LM75 is initialized by programming its OS trip point to its maximum value and its HYST trip point to its minimum value (step 300). This will prevent the LM75 from automatically driving its OSO output. Next, timer 104 is programmed to generate a SMI every n seconds (step 302). While n can be any time period, it is beneficial to set n at a value small enough capture relatively small temperature changes, but not so small as to cause a noticeable slowing of user and system applications. An illustrative time period that meets these guidelines is 10 seconds. To initialize the thermal window in step 304, an initial temperature of thermal zone 102 is measured by the LM75. A low temperature threshold (LO_TEMP) is set at x degrees below the measured temperature, and a high temperature threshold (HI_TEMP) is set at x degrees above the measured temperature. The value of x can be set at any value, and in one embodiment is 5C. (High and low temperature thresholds do not have to be symmetrical about the sensed temperature.) The measured temperature, LO_TEMP, and HI_TEMP values are stored in some convenient location such as system RAM 110, NVRAM 120, or host processor 108 cache (not shown in FIG. 1). Following initialization (steps 300 through 304) timer 104 is started at step 306 and timer generated interrupts are repeatedly processed (step 308) to determine if either the LO_TEMP or HI_TEMP thresholds have been crossed.

Initialization of timer 104 and the LM75 (i.e., device 106), can be done during computer system 100 BIOS power on self test (POST) processing, or through the ACPI defined SMI ACPI enabling routine at the time when control of computer system 100 is transferred to the ACPI operating system.

Figure 4:
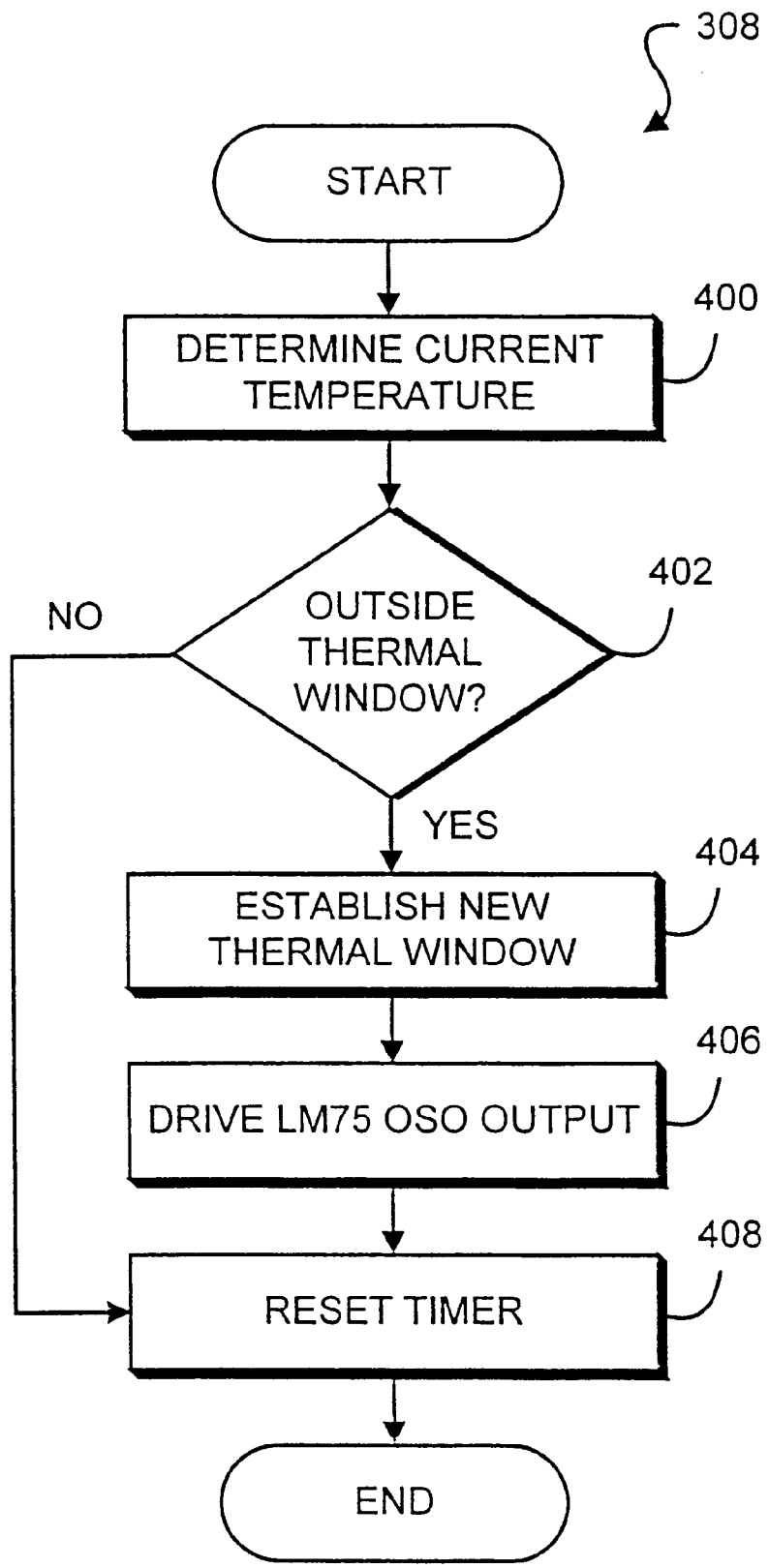
FIG. 4 shows a method to respond to a timer generated system management interrupt.

Referring to FIG. 4, an expanded description of SMI response operations (step 308) is provided. When timer 104 expires a SMI is generated which invokes a SMI handler. SMI handler polls the LM75 to determine the current temperature (CUR_TEMP) for thermal zone 102 (step 400). If CUR_TEMP is outside the thermal window defined by LO_TEMP and HI_TEMP, i.e., is below LO_TEMP or above HI_TEMP (the 'yes' prong of step 402), the SMI handler establishes a new thermal window by setting LO_TEMP to x degrees below CUR_TEMP and HI_TEMP to x degrees above CUR_TEMP (step 404). Next, the SMI handler causes the LM75 to drive its OSO output (step 406). When the LM75's OSO output is driven, a SCI is generated which informs the ACPI operating system of the thermal event. Once OSO is driven timer 104 is reset (step 408) and the SMI handler returns control to the operating system. If the measured current temperature is within the established thermal window (the 'no' prong of step 402), the SMI handler resets timer 102 at step 408. Appendix A provides 80X86 assembly code for use with a LM75 thermal device.

A method in accordance with FIGS. 2 and 4 adjusts thermal device 106's trip points to allow detection of incrementally increasing and decreasing temperatures. And, while the temperature of thermal zone 102 is monitored on a regular (periodic) basis, the operating system is notified (via a SCI) only when a thermal threshold is crossed.

In general, a SCI generated by thermal device 106 output (at step 406) causes the ACPI operating system to call BIOS code via the GP_STS register in the ACPI register set. This, in turn, invokes original equipment manufacturer (OEM) BIOS code that obtains a current temperature value from the LM75 and returns it to the operating system.

The foregoing description is illustrative only and is not to be considered limiting. Various changes in the materials, components, circuit elements, as well as in the details of the illustrated operational methods are possible without departing from the scope of the claims. For example, either system bus 112 or secondary bus 116 can be proprietary or special purpose buses, peripheral component interface (PCI) buses, industry standard architecture (ISA) buses, extended industry standard architecture (EISA) buses, or combinations of one or more of these busses. Further, timer 104 can be coupled to system bus 112, secondary bus 116, directly to host processor 108, or to host processor 108 through an interface circuit (not shown in FIG. 1). Similarly, thermal device 106 can be electrically coupled to system bus 112, secondary bus 116, directly to host processor 108, or to host processor 108 through an interface circuit (not shown in FIG. 1). Thermal device 106 can be thermally coupled to host processor 108 or any other source of heat in computer system 100 such as a power supply or video controller 124. Computer system 100 may also include more than one thermal zone, each zone having it own thermal device. Steps of the invention may be performed by a computer processor executing instructions organized into a program module. Storage devices suitable for tangibly embodying computer program instructions to perform the tasks of the SMI handler include all forms of nonvolatile memory including, but not limited to: semiconductor memory devices such as EPROM, EEPROM, and flash devices; magnetic disks (fixed, floppy, and removable); other magnetic media such as tape; and optical media such as CD-ROM disks.

Appendix A

```
; ****************************************************************
;       InitLM75Monitor
;       Routine Functional Description:
;           Initialize temperature monitor for ACPI
;       Procedure:
```

-continued

Appendix A

```
;       Configure LM75 Temperature Sensor
;       Set Hysteresis Temperature
;       Set Shut Down Temperature
;       Set upper and lower temperature bands
;   Calling sequence: call InitLM75Monitor
;   Entry:  ds == cs
;           es = ACPI scratch segment
;   Exit:   None
;   Regs:   All registers preserved.
;****************************************************************
InitLM75Monitor proc    near
;****************************************************************
;       Configure LM75 Temperature Sensor
;       Set Hysteresis Temperature
;       Set Shut Down Temperature
;****************************************************************
                                        ; Configure LM75
        mov     si,offset Configure_LM75L
        call    smiLM75Transaction      ;
        mov     si,offset Set_MaxShut   ; Set Max shutdown
        call    smiLM75Transaction      ;
        mov     si,offset Set_MinHyst   ; Set Min hysteresis
        call    smiLM75Transaction      ;
;****************************************************************
;       Set upper and lower temperature bands
;       Set Hysteresis Temperature
;       Set Shut Down Temperature
;****************************************************************
        mov     si,off set Get_TCurrent ; Get current temp
        call    smiLM75Transaction      ;
        and     ax,0FF80h               ; Save temperature bits
                                        ; Save it
        mov     es: [edi.ACSS_TEMPERATURE],ax
        add     ax,0280h                ; Add 2.5 degrees
        shr     ax,7                    ; Temp in top 9 bits
        mov     bl,10                   ; 5 degrees in ½ deg
increments
        div     bl                      ; Truncate down to nearest 5
degrees,
        mul     bl                      ; (actually rounding to
nearest 5
                                        ; because we added 2.5 degrees
                                        ; earlier)
        shl     ax,7                    ; Back up to temp bits
        add     ax,0500h                ; Round up 5 degrees
        mov     ds: [TempUpband],ax     ; Save temperature upper band
        mov     es: [edi.ACSS_SHUTDOWN],ax
        sub     ax,0A00h                ; Compute lower band
        mov     ds: [TempLoBand],ax     ; Save it
        mov     es: [edi.ACSS_HYSTERESIS],ax
;****************************************************************
;       Clear Residual Status
;****************************************************************
        mov     dx,VADER_SM_INDEX       ; Get SMI/SCI source register
        mov     al,SMISCI_INDEX         ;
        out     dx,al                   ;
        inc     dx                      ;
        in      al,dx                   ; Current sources
        and     al,NOT (SMISCI_TEMPCAUT+SMISCI_WAKEUP)
        out     dx,al                   ; Clear temp caution
                                        ; Temperature sensor is set
        or      B ds: [TempFlags],TMON_READY
        ret
InitLM75Monitor endp
;****************************************************************
        page
;****************************************************************
;   TempMonHandler
*LH1
;   Routine Functional Description:
;       Process temperature monitor SMIs.
;   Procedure:
;       Read LM75 temperature
;           If outside temperature band
;           Set new temperature band
;           Force TEMPCAUT SCI
;   Calling sequence:   call    TempMonHandler
```

-continued

Appendix A

```
;       Entry:  ds == cs
;               es = ACPI scratch segment
;       Exit:   None
;       Regs:   All registers preserved.
;*****************************************************
TempMonHandler proc     near
;*****************************************************
;       Get new temperature and save it
;*****************************************************
        mov     si,offset Get_TCurrent          ; Get current temperature
        call    smiLM75Transaction              ;
        and     ax,0FF80h                       ; Save temperature bits
                                                ; Save it
        mov     es: [edi.ACSS_TEMPERATURE],ax
;*****************************************************
;       Check for thermal point met
;*****************************************************
        cmp     ax,ds: [TempUpBand]             ; Q: Met or exceeded upper band
?
        jge     tmh_ForceThermalSCI             ; Yes
        cmp     ax,ds: [TempLoBand]             ; Q: Met or exceeded lower band
?
        jg      tmh_Exit                        ; No
;*****************************************************
;       Thermal point met
;           Adjust lower and upper bands
;           Unmask TEMPCAUT event
;*****************************************************
tmh_ForceThermalSCI:
        add     ax,0280h                        ; Add 2.5 degrees
        shr     ax,7                            ; Temp in top 9 bits
        mov     bl,10                           ; 5 degrees in ½ deg
increments
        div     bl                              ; Truncate down to nearest 5
degrees,
        mul     bl                              ; (actually rounding to
nearest 5
                                                ; because we added 2.5 degrees
                                                ; earlier)
        shl     ax,7                            ; Back up to temp bits
        add     ax,0500h                        ; Round up 5 degrees
        mov     ds: [TempUpband],ax             ; Save temperature upper band
        mov     es: [edi.ACSS_SHUTDOWN],ax
        sub     ax,0A00h                        ; Compute lower band
        mov     ds: [TempLoBand],ax             ; Save it
        mov     es: [edi.ACSS_HYSTERESIS],ax
        mov     dx,VADER_SM_INDEX               ; Vader index
        mov     al,SMISCI_MNASKINDEX            ; Get SMI/SCI mask register
        out     dx,al                           ;
        inc     dx                              ;
        in      al,dx                           ; Get current mask
                                                ; Unmask TEMPCAUT SCIs
        and     al,NOT SMISCI_MSK_TEMPCAUT
        out     dx,al                           ;
;*****************************************************
;       Force thermal SCI
;*****************************************************
                                                ; Make LM75 active high
        mov     si,offset Configure_LM75H
        call    smiLM75Transaction              ;
tmh_Exit:
        ret                                     ; Bye
TempMonHandler  endp
;*****************************************************
        page
;*****************************************************
;       DoLM75Operation?
;       Routine Functional Description:
;           Check to se if we can do LM75 operation
;       Procedure:
;           If I2C bus is free
;               OK to read LM75
;       Calling sequence: call DoLM75Operation?
;       Entry:  None
;       Exit:   NZ == Don't perform LM75 operation
;               ZR == Perform LM75 operation
;       Called by:
```

-continued

Appendix A

```
;               shwACPISWSMIHandler
;               shwACPIHWSMIHandler
;       Regs:   None
;****************************************************************
DoLM75Operation?        proc near
        pusha                                   ; Save registers
;****************************************************************
;       ECC SPD read in progress?
;****************************************************************
        mov     al, SB_ECC_ERRORS               ; Q: SPD in Progress?
        call    shwReadCMOS                     ;
        test    al,SPD_IN_PROGRESS              ;
;****************************************************************
;       Set next SMI
;****************************************************************
        pushf                                   ; Save flags
        mov     bx,DEVSEL_PWR                   ; South bridge power management
        mov     di,GP_TMR_CNT                   ; GP Timer Control (50h)
                                                ; Assume LM75 access ok. (SMI
every 10
                                                ; seconds
        mov     ecx,0A00h+GPO_START+GPO_ARLD+GPO_BASE_SEC
        jz      @f                              ; Jump on OK
                                                ; Not ok. Try LM75 op in a 250
msec
        mov     ecx,0400h+GPO_START+GPO_ARLD+GPO_BASE_62MS
@@:
        smfcall WritePCIDWord                   ;
        mov     dx,ds: [SbridgeACPIBase]        ; South bridge ACPI base
        add     dx,GBL_EN                       ; Point to Global enable
        in      ax,dx                           ; Get current value
        or      al,GP0TO_EN                     ; Enable timer 0 SMIs
        out     dx,ax                           ;
        popf                                    ; Restore flags
        popa                                    ; Restore registers
        ret                                     ; Bye
DoLM75Operation?        endp
;****************************************************************
```

What is claimed is:

1. A thermal management method for a computer system having a thermal device and a timer, the method comprising:
   establishing a thermal window;
   causing the timer to generate an interrupt at a specified interval;
   processing the interrupt by determining if a current temperature is outside the established thermal window and, if so, notifying an operating system.

2. The method of claim 1, wherein the thermal device comprises a National Semiconductor LM75 device.

3. The method of claim 1, wherein establishing a thermal window comprises:
   determining a current temperature of the computer system;
   setting a low temperature threshold to a value corresponding to the current temperature minus a specified temperature difference; and
   setting a high temperature threshold to a value corresponding to the current temperature plus the specified temperature difference.

4. The method of claim 1, wherein the specified temperature difference is between approximately 1 degree Centigrade and approximately 15 degrees Centigrade.

5. The method of claim 4, wherein the specified temperature difference is approximately 5 degrees Centigrade.

6. The method of claim 1, wherein the specified interval is between approximately 1 second and approximately 300 seconds.

7. The method of claim 6, wherein the specified interval is approximately 10 seconds.

8. The method of claim 1, wherein the interrupt is an advanced configuration and power interface transparent interrupt.

9. The method of claim 8, wherein the advanced configuration and power interface transparent interrupt is a system management interrupt.

10. The method of claim 1 further comprising adjusting the thermal window if the current temperature is outside the established thermal window.

11. The method of claim 10, wherein adjusting the thermal window comprises:
   resetting a low temperature threshold to a value corresponding to the current temperature minus a specified temperature difference; and
   resetting a high temperature threshold to a value corresponding to the current temperature plus the specified temperature difference.

12. The method of claim 11, wherein the specified temperature difference is approximately 5 degrees Centigrade.

13. A thermal management method for a computer system executing an advanced configuration and power interface operating system having a thermal device and a timer, the method comprising:
   determining an initial temperature of the computer system;
   establishing a thermal window by setting a low temperature threshold to the initial temperature minus a specified temperature difference and setting a high temperature threshold to the initial temperature plus the specified temperature difference;

initializing the timer to generate a system management interrupt at a specified interval;

processing the interrupt by determining a current temperature of the computer system and, if the current temperature is outside the established thermal window, then resetting the low temperature threshold to a value corresponding to the current temperature minus the specified temperature difference, resetting the high temperature threshold to a value corresponding to the current temperature plus the specified temperature difference, and notifying the operating system that a thermal event has occurred.

14. The method of claim 13, wherein the thermal device comprises a National Semiconductor LM75 device.

15. The method of claim 13, wherein the specified temperature difference is between approximately 1 degree Centigrade and approximately 15 degrees Centigrade.

16. The method of claim 15, wherein the specified temperature difference is approximately 5 degrees Centigrade.

17. The method of claim 13, wherein the specified interval is between approximately 1 second and approximately 300 seconds.

18. The method of claim 17, wherein the specified interval is approximately 10 seconds.

19. A computer system comprising:

a bus;

a host processor electrically coupled to the bus and adapted to execute an advanced configuration and power interface operating system;

an input-output device electrically coupled to the bus;

a thermal device electrically coupled to the bus and thermally coupled to a device of the computer system;

a timer electrically coupled to the bus and adapted to generate an interrupt at a specified interval; and a thermal circuit operatively coupled to the thermal device and the timer and adapted to:

receive the interrupt, obtain a temperature value from the thermal device, and determine if the temperature value is outside a predefined thermal window and, if it is, adjust the predefined thermal window and notify the operating system by a system control interrupt.

20. The computer system of claim 19, wherein the thermal device is a National Semiconductor LM75 device.

21. The computer system of claim 19, wherein the input-output device is a network interface card.

22. The computer system of claim 19, wherein the thermal device is thermally coupled to the host processor.

23. The computer system of claim 19, wherein the specified interval is between approximately 1 second and approximately 300 seconds.

24. The computer system of claim 19, wherein the interrupt is a system management interrupt.

25. The computer system of claim 24, wherein the thermal circuit is a system management interrupt handler.

26. A computer program for thermal management of a computer system adapted to execute an advanced configuration and power interface operating system and having a thermal device, the computer program being stored on a media readable by the computer system and comprising instructions for causing the computer system to:

establish a thermal window;

cause a timer to generate an interrupt at a specified interval;

process the interrupt by obtaining a current temperature value from the thermal device and, if the current temperature is outside the established thermal window, notifying the operating system that a thermal event has occurred.

27. The computer program of claim 26, wherein the thermal device comprises a National Semiconductor LM75 device.

28. The computer program of claim 26, wherein the media is system read only memory.

29. The computer program of claim 26, wherein the instructions for establishing a thermal window comprise instructions to:

read a current temperature value from the thermal device;

set a low temperature threshold to a value corresponding to the current temperature minus a specified temperature difference; and set a high temperature threshold to a value corresponding to the current temperature plus the specified temperature difference.

30. The computer program of claim 29, wherein the specified temperature difference is between approximately 1 degree Centigrade and approximately 15 degrees Centigrade.

31. The computer program of claim 30, wherein the specified temperature difference is approximately 5 degrees Centigrade.

32. The computer program of claim 26, wherein the specified interval is between approximately 1 second and approximately 300 seconds.

33. The computer program of claim 32, wherein the specified interval is approximately 10 seconds.

34. The computer program of claim 26, wherein the interrupt is transparent to the advanced configuration and power interface operating system.

35. The computer program of claim 34, wherein the transparent interrupt is a system management interrupt.

36. The computer program of claim 26 further comprising instructions to adjust the thermal window if the current temperature is outside the established thermal window.

37. The computer program of claim 36, wherein the instructions to adjust the established thermal window comprise instructions to:

reset a low temperature threshold to a value corresponding to the current temperature minus a specified temperature difference; and reset a high temperature threshold to a value corresponding to the current temperature plus the specified temperature difference.

38. The computer program of claim 37, wherein the specified temperature difference is approximately 5 degrees Centigrade.

39. A method for use in thermal management in a computer system adapted to execute an operating system that includes a thermal device that senses a temperature in the computer system but does not initiate delivery of thermal information to the operating system except when the sensed temperature passes out of a programmable preset thermal window, the method comprising;

maintaining a thermal window having low temperature and high temperature threshold values; and adjusting the thermal window in response to the sensed temperature if the sensed temperature is outside the thermal window.

40. The method of claim 39, wherein the thermal device comprises a National Semiconductor LM75 device.

41. The method of claim 39, wherein adjusting the thermal window comprises:

adjusting the low temperature threshold to a value corresponding to the sensed temperature minus a specified temperature difference; and adjusting the high temperature threshold to a value corresponding to the sensed temperature plus the specified temperature difference.

42. The method of claim 41, wherein the specified temperature difference is between approximately 1 degree Centigrade and approximately 15 degrees Centigrade.

43. The method of claim 42, wherein the specified temperature difference is approximately 5 degrees Centigrade.

44. The method of claim 39, wherein the thermal device senses a temperature every n seconds.

45. The method of claim 44, wherein n is between approximately 1 second and approximately 300 seconds.

46. The method of claim 45, wherein n is approximately 10 seconds.

47. The method of claim 39, wherein the operating system is an advanced configuration and power interface operating system.

* * * * *